May 8, 1951

M. COPLEY 2,551,789

ADJUSTABLE SPRAYING APPARATUS

Filed Oct. 28, 1946

INVENTOR.
Maurice Copley
BY
David Alan J. Heller
Attorney

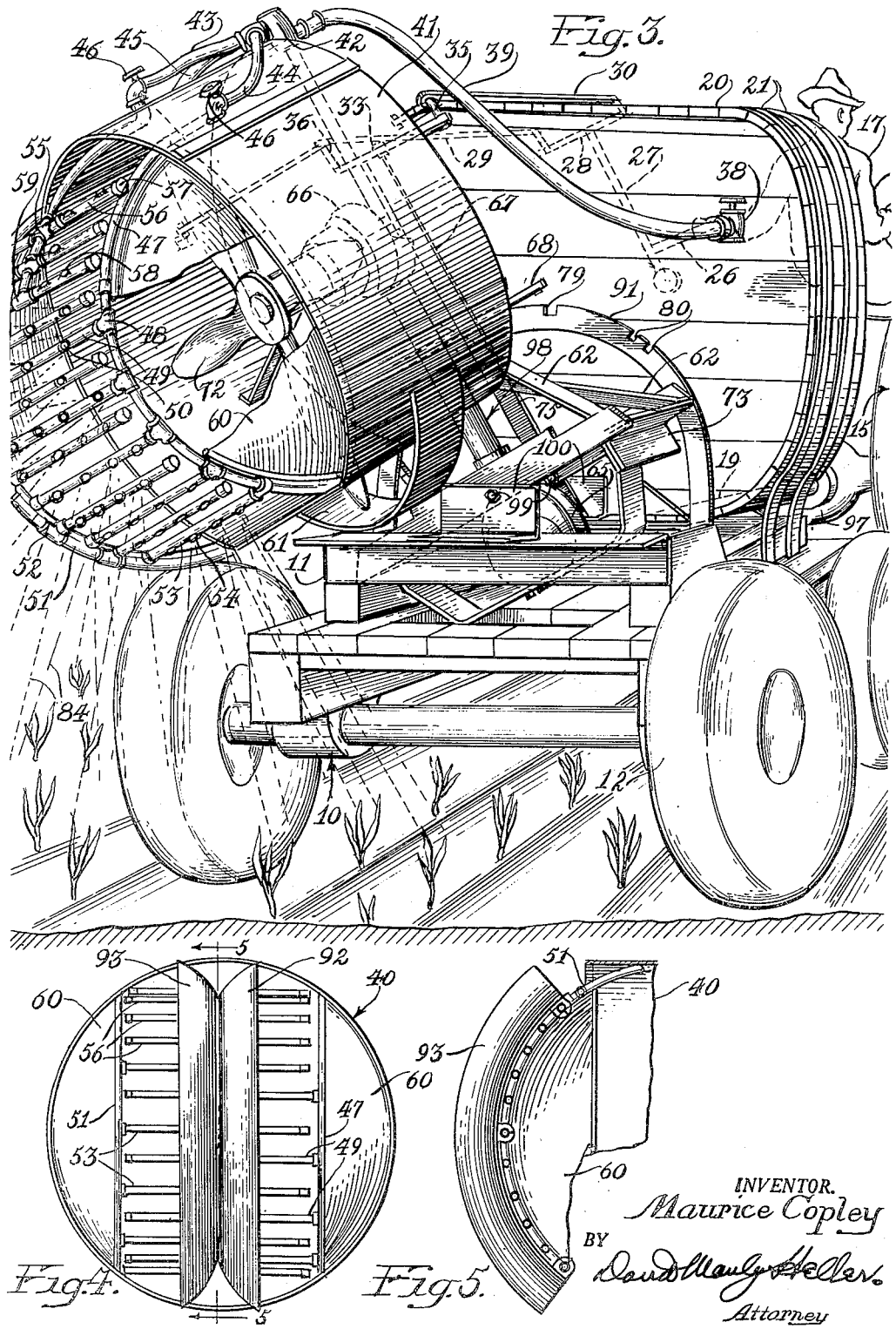

May 8, 1951 M. COPLEY 2,551,789
ADJUSTABLE SPRAYING APPARATUS
Filed Oct. 28, 1946 4 Sheets-Sheet 4

INVENTOR.
Maurice Copley
BY
David Manly Heller
Attorney

Patented May 8, 1951

2,551,789

UNITED STATES PATENT OFFICE 2,551,789

ADJUSTABLE SPRAYING APPARATUS

Maurice Copley, Metropolis, Ill.

Application October 28, 1946, Serial No. 706,123

4 Claims. (Cl. 299—41)

My invention relates to devices, or equipment adapted for spraying trees, as well as row crops, and is primarily comprised of a liquid spray tank, mounted on a suitably propelled vehicle, having mounted in association therewith, a sprayer head which is of such a construction as to permit the said spraying head to be manually operated in a horizontal plane, over a certain fixed, and definite angular range, the said spraying head being also connected to driving means through suitable differential gearing, to permit the said spraying head to be adjustably positioned in varied angular positions in a plane perpendicular to the plane of the spraying operation, or manipulation.

An important object of my invention is to provide a spraying head of the aforementioned character, which is made up of arcuately formed pipe structure, equipped with intermediately positioned and alternately connected pipe connectors, each equipped with a multiplicity of spraying nozzles, the said spraying head being adapted, by virtue of a propeller or fan mounted rearwardly thereof, to spray and create a continuous fog, or mist of spraying liquid to cover tree, or row crops thoroughly from all sides, thus permitting the spraying insecticide to cover thoroughly all portions of fruit, leafage, branches, and other elements of plant life, so as to prevent attack from animal and pest life which effectively destroy the crops of such plants and trees.

A further object of my invention is to provide a device, or machine of the aforementioned character which is equipped with its own motive power for operating the pumping equipment associated therewith, so as to create a most effective spray, or mist in the actual operation of the device.

A further object of my invention is to provide a secondary manipulative control, which may be actuated by an operator who is positioned on the chassis in the space intermediate the control lever 75 and the spray head 40.

A further object of my invention is to provide a slightly modified spray head structure, in which two arcuate baffles are positioned centrally and longitudinally within the confines of the spray head nozzles, in order to deflect the spray sidewise, and cause no spray to flow from the central portion thereof; the said arrangement being particularly adaptable when spraying sides of adjacent trees, so as to conserve, rather than waste, the spraying liquid, or solution.

A further object of my invention is to provide, in a spray head of the aforementioned character, a fan, or propeller construction, which will aid in forcing and dissipating the spray, or mist emanating from the nozzles of the said spray head so as to more effectively distribute the spray liquid over the plant life, which is being sprayed.

A further object of my invention is to provide a pumping unit, which is connected to three branches or spray sections, comprising the said spray head, so that they may all be operating in concert, or selectively in various permutations, and combinations thereof, by suitable valve control structure.

A further object of my invention is to provide a spray head, which can be set to various angular positions in a horizontal plane, without appreciably affecting the horizontal, or the relatively right angular manipulation thereof in given or fixed angular orbits.

Other features, and objects inherent in my invention will become apparent from an examination of the accompanying drawings, bearing further reference thereto in the ensuing description, wherein like symbols are used to designate, or denote like parts, and in which, Fig. 1 is a front view of my invention, showing an operator in position, seated on a tractor, and having one of his hands engaging the manipulating lever for operation of the spraying head, in a horizontal manner.

Fig. 3 is a perspective view of the rear portion of the trailer, on which my invention is mounted, showing the spraying head adjusted to an angular position with respect to the fixed adjustment, it is susceptible of being set to, in a vertical plane.

Fig. 4 is a front view of a spray head, slightly modified, to include centrally connected, or removably attachable arcuate deflectors, or wings, in order to divert the spray sidewise, and maintain the central portion of the head free from any spraying action.

Fig. 5 is a view, taken substantially, on the lines 5—5 of Fig. 4.

Figure 1:
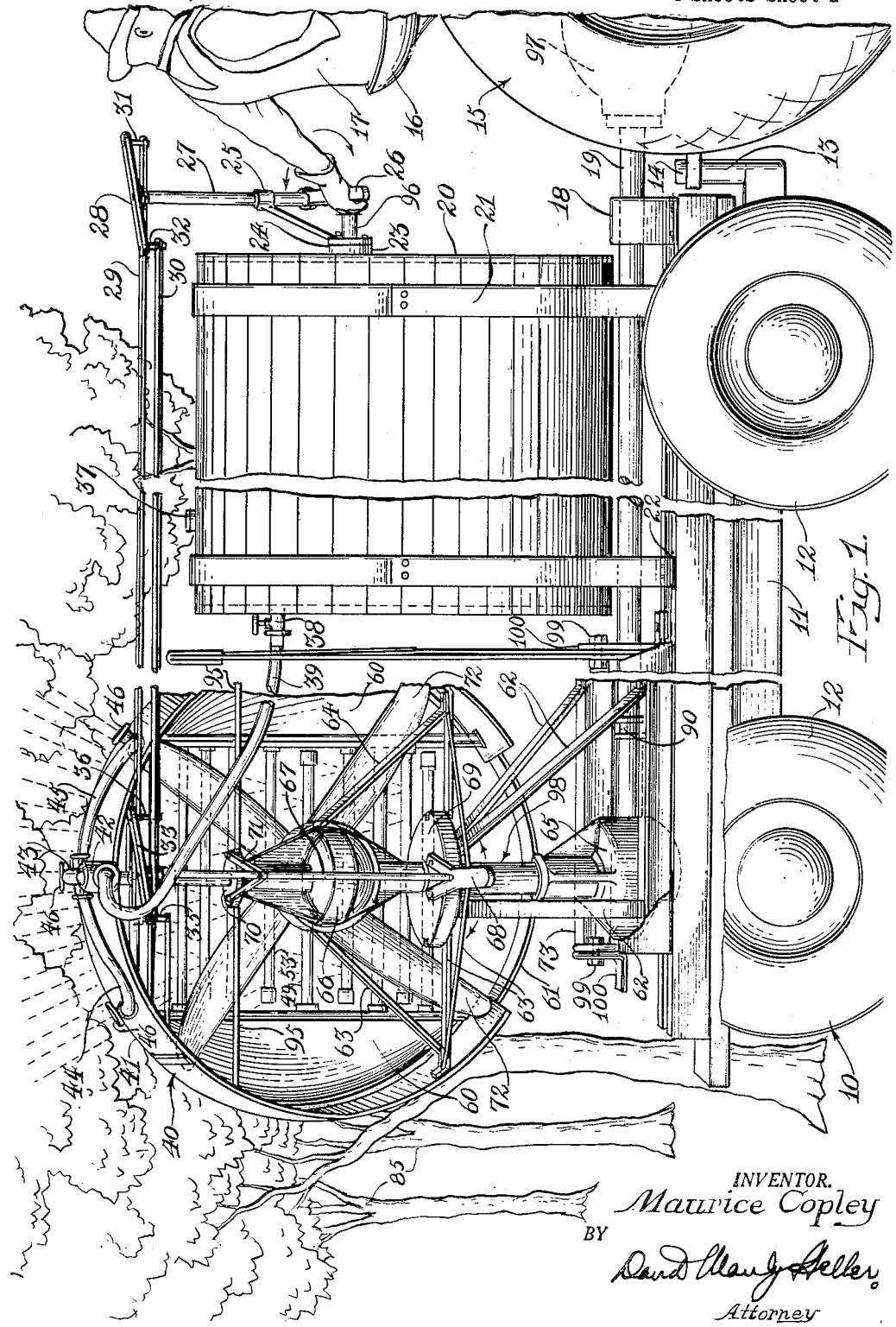
Figure 2:
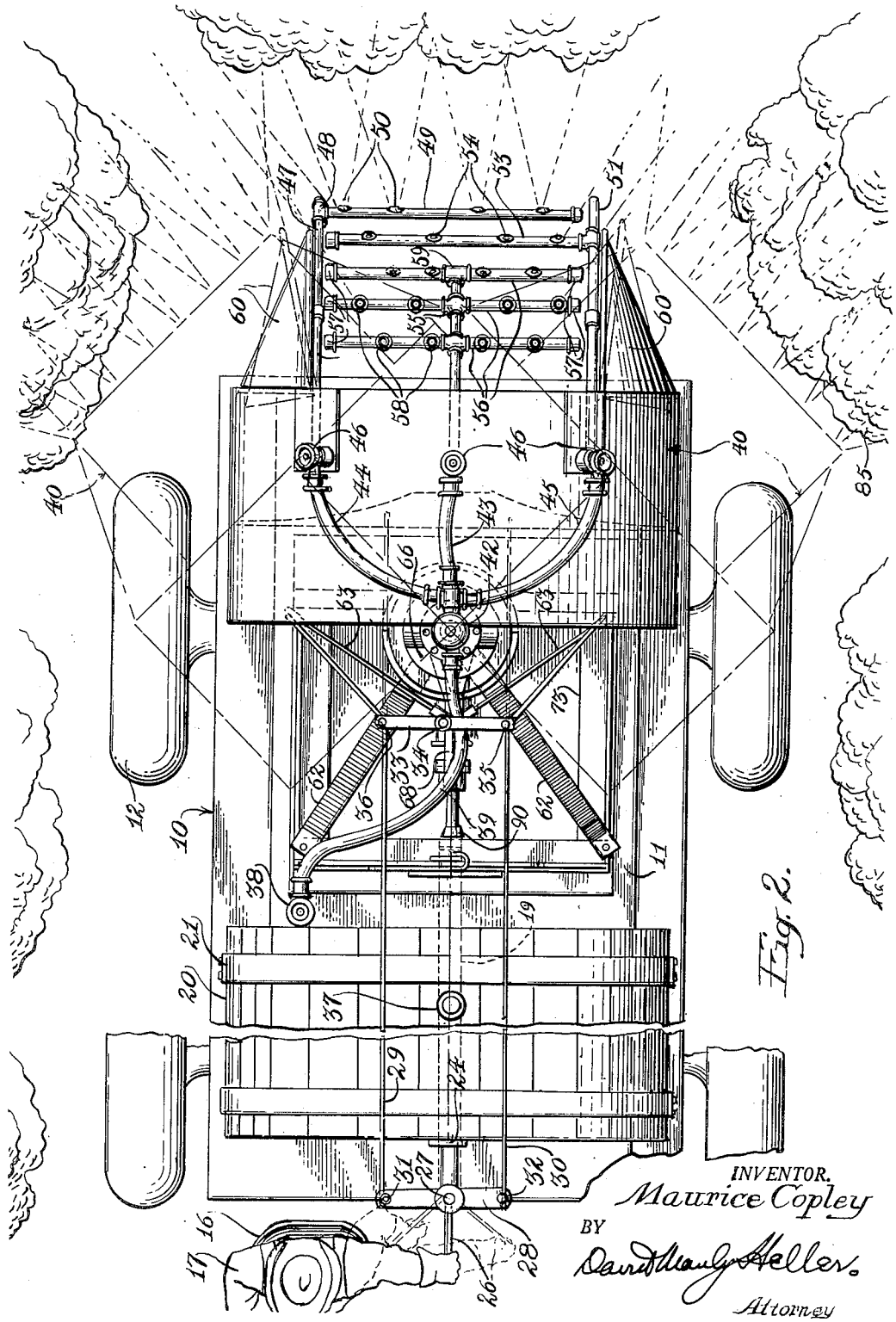
Fig. 2 is a top view of Fig. 1, orientated 180°, in order to clearly indicate the range of the spraying head in a substantially horizontal plane of operation.

Referring to the various views, my invention is generally designated 10, and consists of a trailer chassis 11, mounted on suitable traction wheels 12, the said chassis being provided with a hitching post 13 for securing thereto the hitching element 14 of a tractor generally designated 15. The tractor is, as usual, provided with a seat 16 on which the driver 17 is seated.

The power take-off 97 on the tractor is connected through universal joint, to the power shaft 19, which is housed in suitable bearings 18, as indicated.

On the chassis, I also mount a tank, or container made of wood, or other material designated 20, and held firmly in assemblage to the chassis by virtue of the hoop-like straps 21 firmly anchored, and secured at 22.

The tank is provided with a capped filler opening 37, and an outlet valve 38, which in turn is connected to the spraying head pumping unit 42 by means of the flexible hose connection 39.

The spraying head 40 is manipulated by means of the lever 26, or the lever 68 in the direction of the arrows indicated. The structure for manipulating and translating the motion of the lever 26, consists of an upright shaft 27, which is mounted in suitable bearings 25 secured to the bearing support 24 which, in turn is mounted on a suitable mounting block 23 secured to one end of the tank 20.

The shaft 27 is also provided with an articulate connection secured to the extension 96, so as to articulately be motivated thereupon, whenever it is desired to adjust the head 40, to various angular positions, of which it is capable of setting, in a plane substantially perpendicular to the plane of operation afforded by the lever 26.

The shaft 27 is connected to a link 28, there being a companion link 33, the two being articulately connected by virtue of the tie-rods 30 and 29, having pivotable fastening elements 31 and 32, 35, and 36, forming a parallelogrammic arrangement for balanced actuation of the spray head, generally designated 40. Companion link 33 is pivotably mounted on upright shaft 34 attached to lever 68, see Fig. 1.

The spray head 40 is mounted suitably by struts 63 and 95 attached between the said spray head 40 and the disc-like structures 69 and 70 which are rotatably mounted on upright drive means 98, struts 62 rigidly connecting the housing of upright shaft 98 to cradle structure 73. The structure 73 is pivoted and held on the axis 74 by bolts 99 which are anchored to angles 100 attached to chassis 11. To the power shaft 19 is connected the upright drive means 98, having intermediately disposed differential gear boxes 65, and 66 so as to permit the various adjustments to be made, without impairing the oscillating operation of the head when it is manipulated within the arcuate, or angular range defined therefor. The gear box 65 is supported on the cradle 73, see Fig. 7.

The upright drive connection motivates the pumping unit 42 from which the liquid is disseminated, or fed into one, two, or three branches of the arrangement, or construction, each branch being adapted for connection to the different portions of the spraying head nozzle construction. The pumping unit 42 is secured to the spray head 40 and supported by pipe branches 43, 44 and 45.

The spraying head is generally designated 40, and is comprised of a housing 41, to which is suitably secured the pumping unit 42, branching off to the three branches 43, 44, and 45, each equipped with suitable control valves 46, the branch 44 being connected to an arcuately shaped piping structure 47, the branch 45 being connected to the branch 51, whereas the branch 43 is connected to the three pipes 56, running crosswise of the arcuate pipe structures 47 and 51. The pipes 56 are suitably capped at each end by caps 57, and are each provided with a multiplicity of nozzles 58, the said pipes being inter-connected by suitable crosses 55 and a T 59, thus forming one section of the spraying head, which may be caused to operate independently of the remainder of the spraying head. The spray head 40 is shielded by two adjustable aprons or shields 60 secured to the housing 41.

The arcuate pipe structure 47 is provided with a number of T's 48 connected to a number of pipes 49, having nozzles 50 and being capped at the opposite end, the arcuate pipe structure 51 being likewise equipped with pipes 53, connected through T's 52 being suitably capped and provided with nozzles 54.

It is to be noted that the housing 41 of the spraying head, which comprises the main supporting structure thereof, is open at the bottom, and has a guard section 61, so as to facilitate making the upright driving connection, and at the same time protect the tips of the blades of the propeller 72, which is rotatably connected behind the spraying head for reasons which will be elucidated hereinafter. The propeller 72 is connected through a shaft to gear box 66, see Fig. 3.

The manipulative control 68 is secured to a disc-like structure 69, and there is a companion angular structure 71 secured to a mating disc 70 thereabout, which are in turn, connected by articulate linkage 95, 63, and 64 so as to perform the translation of angular motion from the auxiliary manipulating handle 68 to the head generally designated 40. The angular structure 71 is secured to the handle 68 by virtue of the connecting shaft 67.

In Figs. 4 and 5, I indicate how the spraying head may be slightly modified by showing a deflector structure 92 and 93, at the central portion thereof, in order to permit deflection, and concentration of the spray laterally or sidewise thereof, to prevent spraying within the central range of the said spraying head. An attachment which may be utilized, particularly, when spraying trees so as to spray sides of adjacent trees, without throwing the mist in between the trees, or into empty space consequently wasting the same, thus making for a more economical utilization of the insecticide, or spraying solution.

The angular setting, or fixed adjustment may be effectuated by means of the lever 75 (see Fig. 7) which is provided with a locking control 76, connected integrally to the hinged plate 81, in turn articulately secured at 82, and connected by virtue of the connecting rod 83 to a dog or tooth 78 which is urged by spring 77 in locking engagement with any one of the notches 79, or 80 in the arcuate horse-shoe-shaped locking section 91 which is fixedly secured to the chassis 11 of the trailer.

The phantom, or dotted lines show the manipulations of the lever 75 to any of a number of fixed positions, depending on the notches 79, and 80, aside from the independent manipulative control through levers 68 or 26, that is afforded when actual spraying operation takes place.

Figure 6:
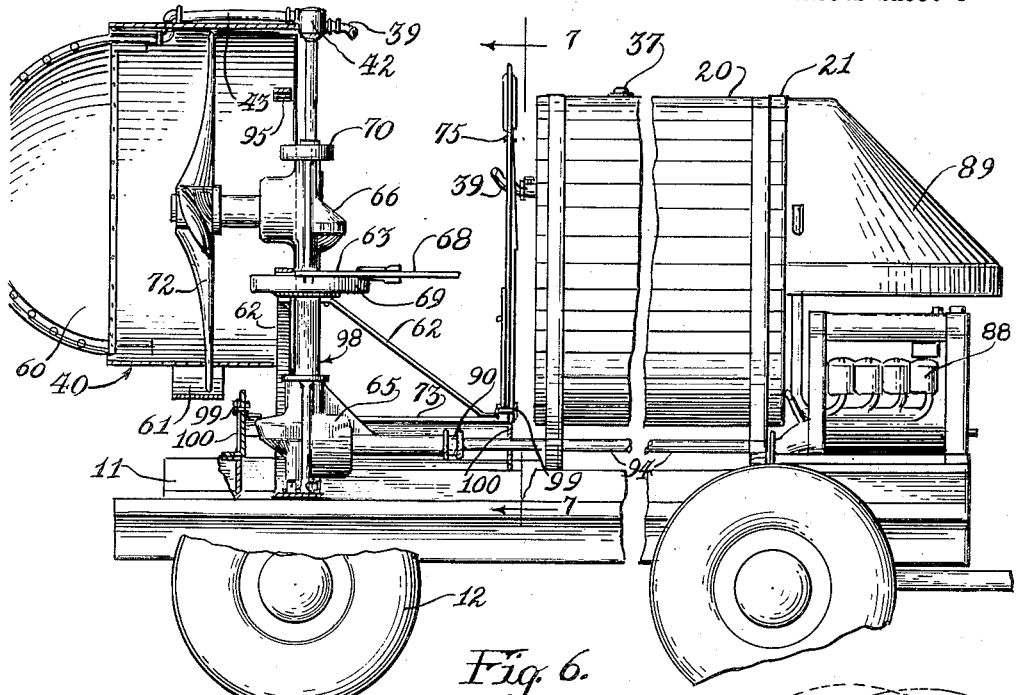
Fig. 6 is a front view of a slightly modified form of spray equipment, having associated therewith independent motive power means, for operating the pumping head, or pump structure thereof.

In Fig. 6, I show a trailer structure which is provided with an independent power plant 88 suitably hooded at 89, for connection through the drive shaft 94, and through the universal joint 96 to the upright drive 98 comprised of the various differential gearing structures, heretofore mentioned to the pumping connection 42, so as to provide sufficient motivating power to the pressure pump 42, for a more efficient spraying action, not necessarily relying on the power of the tractor which is to pull the trailer structure along as the spraying operation is being performed.

Figures 7, 8:
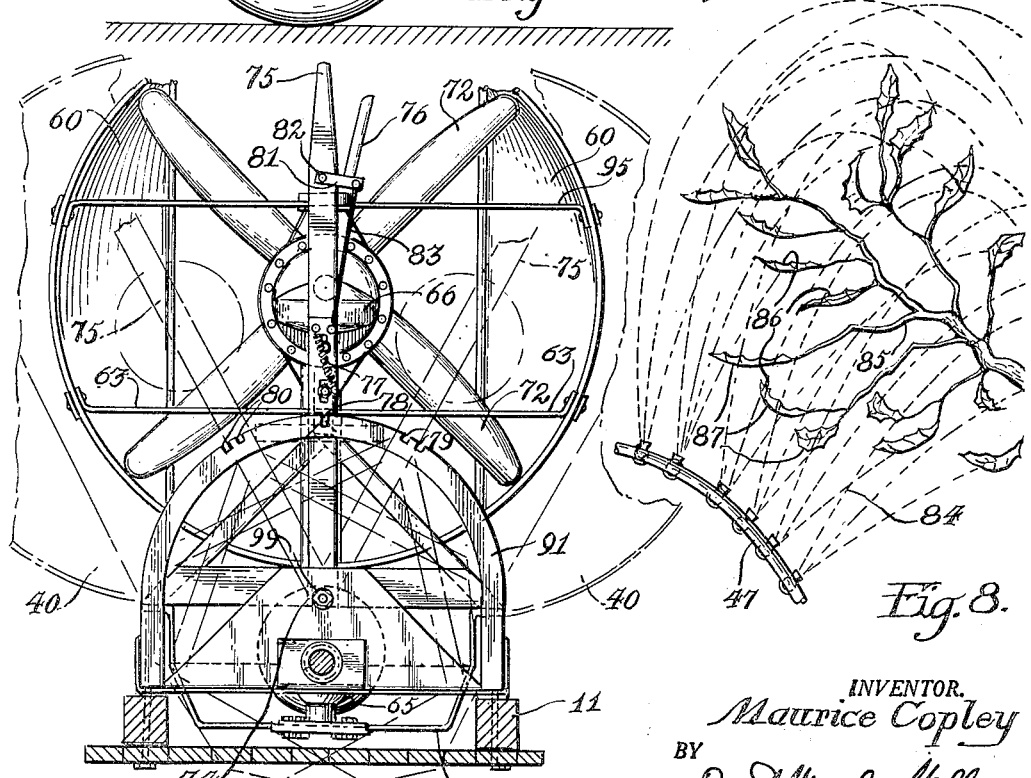
Fig. 7 is an end view of the spray head, showing various angular positions thereof in phantom, and showing its range of adjustment angularly, preparatory to the reciprocal manipulation thereof in a horizontal manner.
Fig. 8 is a schematic view showing the spraying nozzles creating lines of forced spray, or mist in order to completely cover all portions of foliage and crops, or the fruit of a tree, or other plant life.

In Fig. 8 I show a schematic diagram indicating one of the spraying nozzle sections 47, showing how the branches of a tree 85 are covered by the mist, or spray 84 on all sides—86 at the top, and 87 at the bottom thereof, thus making for a complete coverage, and eliminating the necessity of over-spraying, and dripping resulting therefrom, which hence effectuates an economy, rather than a waste of the spraying liquid being used.

In looking at Fig. 3 it can be seen that the head is set at an angle, and the valves 46 in all of the branches are open. A complete spray is effectuated which encompasses almost 180°, in a vertical plane or sections thereof may be utilized by shutting the respective valves 46, shutting off the flow to the branches 43, 44 and 45, and subsequently to the sections 47, or 51, or 56, depending on what is desired, or for any permutations or combinations of the said sections by the proper opening and shutting of as many valves 46, as are desired.

The device, or equipment is very simple to operate, the tank 20 is filled with a suitable quantity of liquid and capped, the exhaust valve thereof 38 is opened, causing the liquid to be drawn off through the piping 39, by the pumping unit 42, which is driven either through the drive shaft 19, or 94, causing sufficient liquid to be passed through the branches 43, 44, and 45, in turn causing a spray to emanate from the nozzles 50, 58, 53, and 54.

The device may be set in any angular position as shown in Fig. 3, for row crops, or crops close to the ground, whereas it may be set in a suitable angular position as shown in Fig. 1 for spraying in an upward direction, towards the top, or the foliage, and the fruit growing on trees.

It is to be noted that my device is susceptible of adjustment so that the manipulative operation, which is defined in an arcuate orbit, is also positionable to various angular positions in a plane at right angles thereto. This affords a great deal of flexibility so that one single equipment may be used for row crops, for trees, or for any other plant life that is grown, and requires spraying.

I believe, I have herein described rather succinctly, the nature, the operation, and the construction of my invention, and inasmuch as the same is susceptible to various modifications, alterations, and improvements I hereby reserve the right to all such modifications, alterations, and improvements coming within the scope and spirit of my invention, as well as all those that are impliably suggested and embraced in the accompanying drawings, also all those that may fall within the purview of the foregoing description, my invention to be limited only to the appended claims.

Having thus described and revealed my invention, what I claim as novel and desire to secure by Letters Patent, is:

1. In an apparatus of the character described, a spray-head, means for adjusting fixedly the said spray-head in varied angular positions in a vertical plane, and parallelogrammic manipulative means provided with laterals articulately connected to the said spray-head for oscillating the said spray-head in a plane substantially at right angles to the said vertical plane.

2. In an apparatus of the character described, a spray-head, means for adjusting fixedly the said spray-head in varied angular positions in a vertical plane, parallelogrammic manipulative means provided with laterals articulately connected to the said spray-head for oscillating the said spray-head in a plane substantially at right angles to the said vertical plane, and hollow partially conical apron means composed of two complementary sections each secured adjustably to the sides of the said spray-head for varying the lateral confines of the mist to be sprayed.

3. In an apparatus of the character described, a spray-head, means for adjusting fixedly the said spray-head in varied angular positions in a vertical plane, parallelogrammic manipulative means provided with laterals articulately connected to the said spray-head for oscillating the said spray-head in a plane substantially at right angles to the said vertical plane, and deflector means secured at the central portion of the said central spray-head to provide concentration of the spray laterally and prevent spraying within the central range of the said spray-head.

4. In an apparatus of the character described, a spray-head, means for adjusting fixedly the said spray-head in varied angular positions in a vertical plane, parallelogrammic manipulative means provided with laterals articulately connected to the said spray-head for oscillating the said spray-head in a plane substantially at right angles to the said vertical plane, hollow partially conical apron means composed of two complementary sections each secured adjustably to the sides of the said spray unit for varying the lateral confines of the mist to be sprayed, and deflector means secured at the central portion of the said spray-head to provide concentration of the spray laterally and prevent spraying within the central range of the said spray-head.

MAURICE COPLEY.

REFERENCES CITED

The following references are of record in the file of this patent:

UNITED STATES PATENTS

| Number | Name | Date |
| --- | --- | --- |
| 2,238,120 | Launder | Apr. 15, 1941 |
| 2,310,895 | Brown | Feb. 9, 1943 |
| 2,331,107 | Daugherty | Oct. 5, 1943 |
| 2,374,955 | Raper | May 1, 1945 |
| 2,432,309 | Gore | Dec. 9, 1947 |

FOREIGN PATENTS

| Number | Country | Date |
| --- | --- | --- |
| 350,936 | Great Britain | June 15, 1931 |